US008685297B2

(12) United States Patent
Schreiber

(10) Patent No.: US 8,685,297 B2
(45) Date of Patent: Apr. 1, 2014

(54) METHOD FOR THE MANUFACTURE OF A FIBER-COMPOSITE COMPONENT AND FIBER-COMPOSITE COMPONENT MANUFACTURED ACCORDING TO THIS METHOD

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1289 days.

(21) Appl. No.: 11/979,976

(22) Filed: Nov. 13, 2007

(65) Prior Publication Data

US 2008/0113179 A1 May 15, 2008

(30) Foreign Application Priority Data

Nov. 10, 2006 (DE) .......................... 10 2006 053 985

(51) Int. Cl.
*B32B 3/26* (2006.01)

(52) U.S. Cl.
USPC .......... 264/103; 264/40.1; 264/161; 264/257; 264/258

(58) Field of Classification Search
USPC .......................... 264/257, 40.1, 103, 161, 258
See application file for complete search history.

(56) References Cited

U.S. PATENT DOCUMENTS

| 4,798,954 | A | * | 1/1989 | Stevenson | ................... 250/341.7 |
|---|---|---|---|---|---|
| 5,203,059 | A | * | 4/1993 | Olry et al. | ....................... 28/107 |
| 5,217,766 | A | * | 6/1993 | Flonc et al. | ................... 428/34.5 |
| 5,921,754 | A | * | 7/1999 | Freitas et al. | .................. 416/230 |
| 2002/0121720 | A1 | * | 9/2002 | Davies et al. | .................. 264/103 |
| 2004/0074589 | A1 | * | 4/2004 | Gessler et al. | ................ 156/155 |
| 2004/0195718 | A1 | * | 10/2004 | Obrachta et al. | .............. 264/156 |
| 2006/0169396 | A1 | | 8/2006 | Joern | |
| 2007/0248780 | A1 | * | 10/2007 | Schober et al. | ................. 428/57 |
| 2013/0005208 | A1 | * | 1/2013 | Retz et al. | ..................... 442/189 |

FOREIGN PATENT DOCUMENTS

| DE | 19 38 315 U | 5/1966 |
|---|---|---|
| DE | 100 27 557 C1 | 4/2001 |
| DE | 199 52 443 A1 | 5/2001 |
| DE | 100 61 028 A1 | 6/2002 |
| DE | 202 05 620 U1 | 9/2002 |
| DE | 102 50 826 A1 | 5/2004 |
| DE | 103 01 646 A1 | 7/2004 |
| GB | 23 10 822 A | 9/1997 |
| WO | WO 2005/011962 A1 | 2/2005 |

* cited by examiner

*Primary Examiner* — Matthew Daniels
*Assistant Examiner* — Saheed Huda
(74) *Attorney, Agent, or Firm* — Timothy J. Klima; Shuttleworth & Ingersoll, PLC

(57) ABSTRACT

With a method for the manufacture of fiber-composite components, more particularly of fan blades for aircraft engines, dry fiber mats are superimposed in a lay-up mold, correctly positioned and fixed with locating pins and subsequently sewn in the mold. Metallic indicators are provided on at least one mat. The preformed entity of fiber mats is whipped at its edges with thermoplastic material and subsequently smoothed by application of heat. Remaining fiber residues are cut off. The blank thus available is infiltrated with synthetic resin in an infiltration mold or a sheathing remaining on the component. The fiber mats are checked for correct positioning by non-destructive inspection procedures. The fiber-composite component thus formed conforms to high quality requirements.

6 Claims, No Drawings

METHOD FOR THE MANUFACTURE OF A FIBER-COMPOSITE COMPONENT AND FIBER-COMPOSITE COMPONENT MANUFACTURED ACCORDING TO THIS METHOD

This application claims priority to German Patent Application DE 10 2006 053 985.0 filed Nov. 10, 2006, the entirety of which is incorporated by reference herein.

This invention relates to both a method for the manufacture of a fiber-composite component, more particularly a fan blade made of fiber-composite material for an aircraft engine, in which fiber mats precut according to the shape of the component and superimposed to form a lay-up are infiltrated with synthetic resin, and a fiber-composite component manufactured according to this method.

Fan blades constructed of a fiber-composite material are usually made of fiber mats which are to be superimposed in an open mould with maximum positional accuracy. Automated lay-up of the fiber mats is ruled out since it fails to meet the applicable requirements on positional accuracy. The fiber mats cannot be superimposed with such accuracy that a smooth and precise rim is obtained on the entity of superimposed fiber mats, as a result of which the blade will be inaccurately formed or the entity of fiber mats will improperly fill its sheet-metal sheathing. Further, fiber particles present at the rims may affect the quality of the weld of the sheet-metal sheathing. Another significant disadvantage is that displacement of the fiber mats may occur during infiltration of the synthetic resin into the fiber-mat entity due to long paths and high pressure and that such displacement and the resultant quality nonconformance remain undetected.

A broad aspect of the present invention is to provide a method for the manufacture of a fiber-composite component which ensures high quality of the component as regards the mechanical properties and the shape and weld formation of a sheet-metal sheathing, if applicable.

The present invention provides for the use of dry, non-preimpregnated fiber mats which are fixed in a lay-up mold with locating pins and, while still in the lay-up mold, are sewn together with threads passed vertically through the fiber-mat entity. The entity, which is preformed, stiffened and reinforced by sewing and in which the fiber mats are fixed against the pressure occurring during subsequent infiltration, is whipped at its edges with a thermoplastic material, with the edges being subsequently formed and smoothened by application of heat. In the process, fibers present in the rim area are incorporated into the thermoplastic material. Should fibers still protrude upon application of heat, they are cut off. The blank thus prepared is now infiltrated with synthetic resin in a closed infiltration mold. The finished fiber-composite component has high strength, smooth, fiber residue-free rim contours and a smooth surface finish. The fiber-composite component accurately fits a sheet-metal sheathing which fully or partly encloses the fiber-composite component, with the absence of fiber particles ensuring a weld formation on the sheet-metal sheathing which conforms to the applicable quality requirements.

In accordance with a further feature of the present invention, metal indicators, which can be in the form of thin, soft wires, are sewn into the component during manufacture to enable non-destructive testing to be performed after the synthetic resin infiltration process in which the high infiltration pressure could lead to displacement of the fiber mats.

An embodiment of the method for the manufacture of a fan blade made of fiber-composite material for a gas turbine engine in accordance with the present invention is more fully described below.

Dry fiber mats, i.e. fiber mats which are not preimpregnated with resin, here comprising a weave of carbon fibers, are precut according to a shape of the blade and then placed into a lay-up mold curved according to a curvature of the blade. Locating pins, which are extendable in the downward direction, are provided in the lay-up mold to prevent the fiber mats from being displaced during lay-up of the latter. As the fiber mats are laid up, metallic indicators in the form of thin, soft metal wires or metal wire crosses are positioned, or integrated into the weave, between the mats at certain locations in X, Y and Z directions. The metallic indicators, which can be sewn in using a metal thread, are used, upon completion of the fan blade, for non-destructive inspection of the fiber mats for correct positioning. The superimposed fiber mats are now sewn together in the Z direction in the lay-up mold while still being fixed in the position established by the locating pins. The blade entity so preformed is subsequently whipped at its rim with a thread made of thermoplastic material. By melting up the thermoplastic material with a heating device, the rim is thus smoothed, with any fibers protruding upon application of heat being cut off in the same operation.

Thus, a smooth, carbon particle-free blade edge is produced which precisely fits into a metal sheathing of the blade to be welded in a subsequent operation and exactly mates with an inner circumference of the sheet-metal sheathing and which further ensures that formation of the weld of the sheet-metal sheathing is not affected by carbon particles.

A synthetic resin is now infiltrated under high pressure into the sewn fiber-layer entity. In a first embodiment, the fiber-layer entity is infiltrated with synthetic resin, which liquidizes at higher temperatures, in an essentially closed infiltration mold. Upon cooling and removal of the fiber-composite component from the infiltration mold, the metal indicators, and thus the carbon-fiber weave layers, are inspected by radiology, computer tomography or similar methods for displacement during infiltration to establish conformance of the fiber-composite component with the applicable quality requirements. Subsequently, the fiber-composite component can be enclosed by a laser-welded sheet-metal sheathing.

In accordance with a second embodiment, the fiber-layer entity can be enclosed by a sheet-metal sheathing prior to infiltration, with the synthetic resin then being infiltrated immediately into the sheet-metal sheathing or into the fiber entity located in the sheet-metal sheathing, respectively. Again, the fiber-weave layers are subsequently quality inspected for displacement from their original position after the infiltration of resin—for example, by computer tomography.

The fan blade made and formed according to the above method satisfies the highest quality provisions for correct positioning of the fiber layers, precise dimensioning and accuracy of fit of the fiber-composite entity in the sheet-metal sheathing as well as weld quality of the sheet-metal sheathing and enhanced strength and reduced hazard of delamination obtained by vertically sewing the fiber layers.

The invention is not limited to the above embodiment. For example, other fiber materials or fiber-material combinations may be used and other fiber-composite components likewise be made in the same form and by the same method.

What is claimed is:

1. A method for the manufacture of a fiber-composite component having fiber mats cut according to a shape of the component, superimposed one above the other and infiltrated with synthetic resin, wherein;
- dry fiber mats are precut according to a shape of the component and placed one above the other into a lay-up mold curved according to the contour of the component and correctly positioned and fixed by locating pins passed through the fiber mats;
- while still being positioned and fixed by the locating pins, the superimposed precut fiber mats are subsequently sewn together in the lay-up mold with threads passed vertically through the fiber mats to form a blank;
- the blank thus preformed is whipped at its edges with a thread of thermoplastic material;
- the thermoplastic material is heated-up, the edges are subsequently smoothed with a tool and protruding fiber tips are cut off, and
- the blank is enclosed by a closed mold and subsequently infiltrated with synthetic resin;
- and further comprising:
- incorporating metal indicators distributed in an x/y direction into at least one of the fiber mats placed into the lay-up mold by at least one chosen from sewing on and integrating into a weave,
- after infiltration of the resin, determining displacement of the metal indicators from original positions thereof by detecting a position of the metal indicators externally of the mold by at least one chosen from radiography and computer tomography.

2. The method in accordance with claim 1, wherein the synthetic resin is infiltrated in an infiltration mold in a shape of the component.

3. The method in accordance with claim 2, wherein the infiltrated fiber-composite component is enclosed by a sheet-metal sheathing which mates with the contour of the component.

4. The method in accordance with claim 1, wherein the blank is enclosed by a sheet-metal sheathing remaining at the blank, and the synthetic resin is infiltrated into the blank within the sheet-metal sheathing.

5. The method in accordance with claim 4, wherein the metal indicators comprise wire in a cross shape.

6. The method in accordance with claim 1, wherein the fiber-composite component is a fan blade for an aircraft engine.

* * * * *